United States Patent
Kopti

(10) Patent No.: US 8,713,628 B2
(45) Date of Patent: *Apr. 29, 2014

(54) METHOD AND SYSTEM FOR PROVIDING CLOUD BASED NETWORK SECURITY SERVICES

(75) Inventor: Juzer Kopti, Ashburn, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 299 days.

This patent is subject to a terminal disclaimer.

(21) Appl. No.: 13/022,934

(22) Filed: Feb. 8, 2011

(65) Prior Publication Data

US 2012/0204251 A1     Aug. 9, 2012

(51) Int. Cl.
*G06F 21/00*     (2013.01)
*G06F 21/56*     (2013.01)
*G06F 15/16*     (2006.01)

(52) U.S. Cl.
CPC .............. *G06F 21/56* (2013.01); *G06F 21/567* (2013.01)
USPC ................ 726/1; 726/2; 726/3; 726/4; 726/6; 726/22; 726/23; 726/24; 726/26

(58) Field of Classification Search
USPC .............. 726/11, 1–4, 6, 22–24, 26; 370/389, 370/392, 395.53; 709/225, 226, 227, 235, 709/245
See application file for complete search history.

(56) References Cited

U.S. PATENT DOCUMENTS

2009/0097490 A1* 4/2009 Sanderson et al. ........ 370/395.53
2010/0251329 A1* 9/2010 Wei .................................. 726/1

* cited by examiner

*Primary Examiner* — Kambiz Zand
*Assistant Examiner* — Noura Zoubair

(57) ABSTRACT

An approach is provided for performing cloud based computer network security services. Data traffic from a plurality of networks corresponding to a plurality of subscribers are received. Data traffic is routed to a security platform over a communication path to one or more service aggregators to process the data traffic according to one or more security services performed by the security platform. The security services are provided as a managed service by a service provider. The processed data are received from the one or more service aggregators, and routed to the corresponding one of the networks.

15 Claims, 11 Drawing Sheets

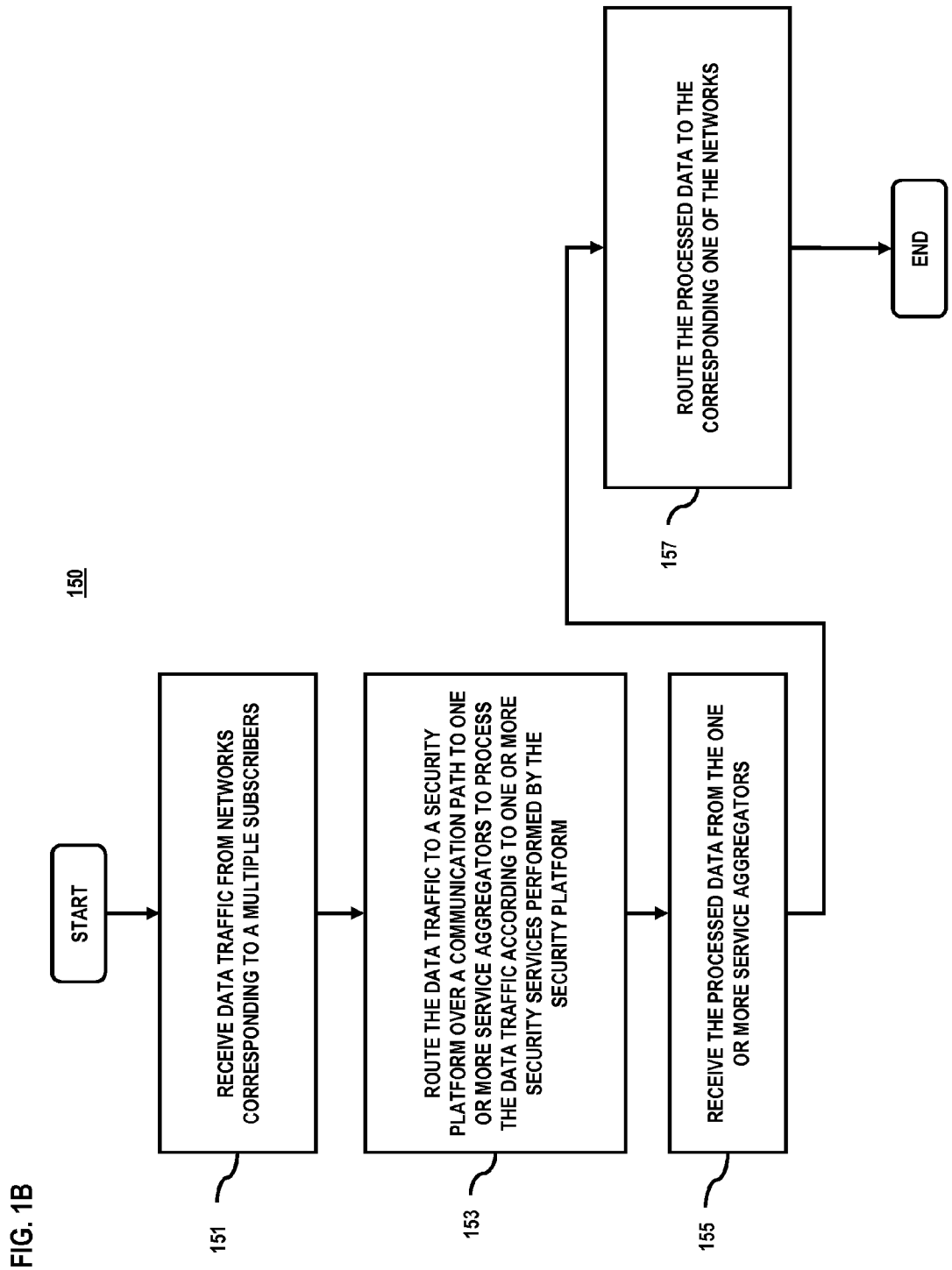

METHOD AND SYSTEM FOR PROVIDING CLOUD BASED NETWORK SECURITY SERVICES

BACKGROUND INFORMATION

Undoubtedly, many businesses, organizations, enterprises, and other entities rely heavily on computer networks as part of their business functions and operations. For example, a large number of businesses conduct commerce over these networks by advertising, selling, and otherwise communicating with third parties. Such networks can involve both trusted and untrusted networks and systems. As such, businesses, particularly large ones, routinely make substantial investments in network security to ensure that their information (which may include sensitive financial and/or personal data) is protected.

All of the legitimate uses of computer networking come with the perils associated with the potential to abuse access to a computer network, both from users within the network and from third parties outside of the network. Such abuse can take a variety of forms, including, for instance, attempts by third parties to disable computer resources ("denial of service attacks"), to misappropriate confidential information, to improperly use computer resources, to infect computers with viruses or other malware, or to send unwanted email ("spam"). Users from within a network can exploit their network privileges to gain access to websites (e.g. audio streaming) unrelated to the legitimate uses of their accounts. These security compromises exact a heavy burden in terms of costs to organizations. Moreover, as the number of users increases, and thus, the network is scaled up accordingly, the security concerns and costs are even greater in that most security solutions do not scale well. That is, as network components are acquired to service the new users, so too are the necessary security software/hardware. Furthermore, new network security threats and attacks are continually encountered, thereby requiring organizations to periodically update their security infrastructures.

Therefore, there is a need for an approach that can efficiently and effectively provide scalable, on-demand computer network security services.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIG. 1B is a flowchart of a process for providing security services, according to an exemplary embodiment;

DESCRIPTION OF THE PREFERRED EMBODIMENT

A preferred apparatus, method, and software for providing cloud based computer network security services are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although various exemplary embodiments are described with respect to certain types of communication devices, it is contemplated that various exemplary embodiments are also applicable to remotely configuring other devices, entities, facilities, systems, etc.

Figure 1A:
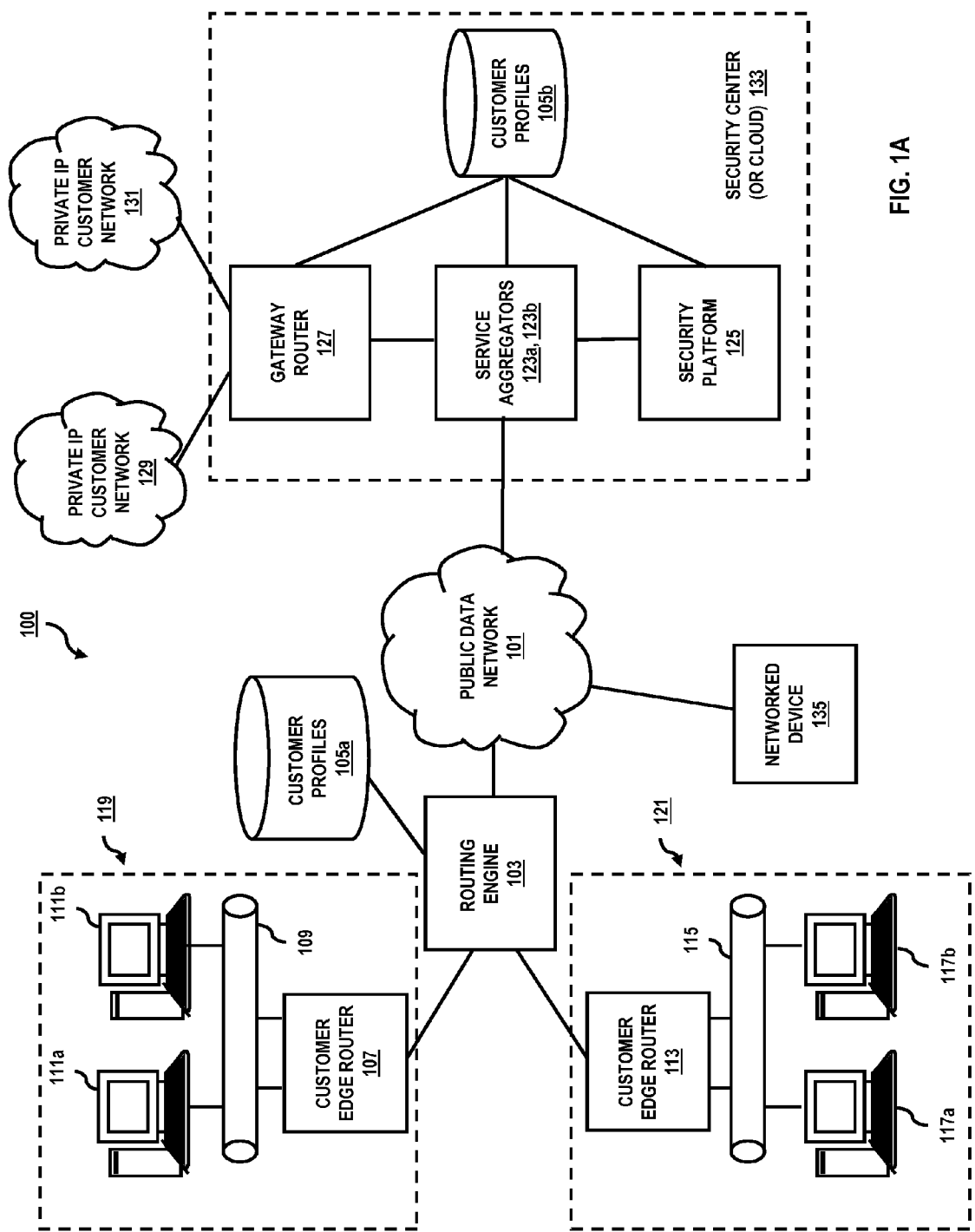
FIG. 1A is a diagram of a system utilizing a security center to provide security services, according to an exemplary embodiment.

FIG. 1A is a diagram of a system utilizing a security center to provide security services, according to an exemplary embodiment. For the purposes of illustration, system 100 for providing computer network security services to customers (or subscribers) is described with respect to multiple customer computer networks 119, 121, 129 and 131. According to certain embodiments, a service provider operates a security center (or cloud) 133 to supply various security services to the subscribers. Each of these networks 119, 121, 129 and 131 can access security center 133 to invoke one or more of the security services, depending on the subscription of the particular customer. Security center 133, in certain embodiments, can be implemented as a network cloud to enable enhanced accessibility by the subscribers' networks 119, 121, 129 and 131. Although the security services of security center 133 are described as a managed service offered by a service provider, it is contemplated that the security center 133 can be deployed by one of the subscribers for its own interconnected, geographically disperse networks (such may be the case for large enterprises).

Because of the problems associated with network abuses (as earlier explained), a variety of computer security services have emerged to protect computer networks from inappropriate or harmful activities. By way of example, these services may include detection and prevention of denial of service attacks, intrusion detection and prevention, web and email filtering, and firewall services. Also, various methods have been devised to enable communications over public networks to take place securely. These methods include virtual private networks (VPNs), secure sockets layer encryption (e.g., Hypertext Transfer Protocol Secure (HTTPS)), and Internet Protocol Security (IPSec), for instance. Unfortunately, the implementation of these services and secure communication methods is generally expensive. It often requires the organization to purchase additional computer hardware and software, and to acquire personnel dedicated to maintaining such infrastructure. Further, the added resources may subsequently become outdated or unnecessary, for example, when a business downsizes or merges with another business.

As shown, customer networks 119 and 121 access the security center 133 through routing engine 103 and a public data network 101 (e.g., the Internet). In this example, customer networks 129 and 131 are private Internet Protocol (IP) networks that access the security center 133 through a gateway router 127. In exemplary embodiments, any number of customers may access security services through any mixture of tiered public and/or private communication networks. According to certain embodiments, these public and/or private communication networks can include a data network, a telephony network, and/or wireless network. For example, the telephony network may include a circuit-switched network, such as the public switched telephone network (PSTN), an integrated services digital network (ISDN), a private branch exchange (PBX), or other like network. The wireless network may employ various technologies including, for example, code division multiple access (CDMA), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like. Additionally, the data network may be any local area network (LAN), metropolitan area network (MAN), wide area network (WAN), the Internet, or any other suitable packet-switched network, such as a commercially owned, proprietary packet-switched network, such as a proprietary cable or fiber-optic network.

Furthermore, as will be described with reference to FIG. 2, the security services may be provided by any number of geographically distributed security centers.

The routing engine 103, which is operated by the security service provider, may receive outgoing data (or traffic) from customer networks 119 or 121 that is bound for external networked devices connected to the public data network 101. For example, computer 111a in customer network 119 may send data to computer 117a in computer network 121, or to other networked devices, such as networked device 135, which may be any type of device, such as a smart phone, computer, or other device, capable of communicating through the public data network 101, or through a private IP network (not shown) that is connected to the customer network 119. The routing engine 103 accesses a customer profiles database 105a to determine the services to be applied to the data. Depending on the security service that is involved, the routing engine 103 will route the outgoing data through the public data network 101 to the security center 133. As discussed, center 133 is operated by a security service provider and may perform various security operations on the data going into and coming out of the customer's network, as will be further described with reference to FIGS. 3-6.

The routing engine 103 may receive incoming data (from e.g. networked device 135) through the public data network 101 that is bound for customer networks 119 or 121. The routing engine 103 intercepts this incoming data, and accesses the customer profiles database 105a to determine the security services to be performed for the target customer on incoming data. Depending on the security service that is involved, the routing engine 103 will route the outgoing data through the public data network 101 to the security center 133, which may perform various security operations on the outgoing data, as will be further described with reference to FIGS. 3-6. The communication protocol between the routing engine 103 and the security center 133 depends on the particular security service that is involved, as will be described with reference to FIGS. 3-6 and 8-9. The security center 133 may prevent certain data from being sent to its target address within the customer networks 119 or 121, or it may send processed data to the routing engine 103 for delivery to the target address within the customer networks 119 or 121.

Security services are provided to the private IP customer networks 129 and 131 through a gateway router 127. Upon receiving data from either of the private IP customer networks 129 or 131, the gateway router 127 examines customer information stored in a customer profiles database 105b, which contains information pertaining to the customers associated with the private IP customer networks 129 and 131. (The customer profiles database also includes the information within the customer profiles database 105a.) Based on that information, the gateway router may send the data to service aggregators 123a and 123b for further processing.

Similarly, customer data arriving at the security center 133 through the public data network 101 from routing engine 103 is provided to the service aggregators 123a and 123b. In exemplary embodiments, there may be only one service aggregator, or any number of service aggregators. The service aggregators 123a and 123b maintain the separation of data from the plurality of client networks 119, 121, 129 and 131 by enforcing multi-tenancy rules. The services aggregators 123a and 123b also control the sequence of the security services performed by a security platform 125 with respect to customer data, and control the transmission of data back to customer networks 119, 121, 129 and 131 and/or the original targets of the data (for outgoing customer transmissions).

As shown in FIG. 1B, the process 150 for applying various security services to the customer's data is explained. According to one embodiment, this process 150 is executed by the routing engine 103. In step 151, data traffic is received from one or more networks (e.g., networks 119 and 121) corresponding the respective subscribers. Next, the process 150, per step 153, routes the data traffic to the security platform 125 over a communication path to one or more service aggregators 123a, 123b to process the data traffic according to one or more security services performed by the security platform 125. The security services can include firewalling, content filtering, intrusion detection, anti-denial of service, or a combination thereof.

The communication path, according to one embodiment, includes one or more virtual private network sessions (e.g., using MPLS) transporting the respective traffic from the customer networks 119 and 121. Such communication path can be established using a multi-tenancy format for the subscribers.

In one embodiment, the security platform 125 is configured to determine the one or more security services associated with one of the subscribers; this determination can be made by accessing the appropriate profiles in database 105b. According to one embodiment, the data is processed in a predetermined sequence based on the security services for the particular subscriber. In step 155, the routing engine 103 receives the processed data from the one or more service aggregators 123a, 123b, and routes the processed data to the corresponding one of the networks 119 and 121 (per step 157).

For purposes of illustration, the customer network 119 include a multitude of computers 111a and 111b that are linked by a local area network (LAN) 109 to a customer edge router 107. Similarly, the customer network 121 can connect multiple computers 117A and 117B that are linked by a LAN 115 to a customer edge router 113. In exemplary embodiments, the customer network 119 may comprise any number of networked devices that communicate with one or more customer edge routers through any number of tiered LAN's, wide area networks (WANs) or any other type of network. The LANs, such as LAN 109, may be of any type, including Ethernet and Wi-Fi. Similarly, there is no restriction on the type of WAN that may comprise part of a customer network.

The security services provided by the security center 133 may be transparent to the customer networks 119 and 121. In particular, the customer edge routers 107 and 113 may interact with the routing engine 103 as if a normal internet communication was taking place. The routing engine 103, based on the data in the customer profiles database 105a, has the capability of seamlessly redirecting communications to/from customer networks 119 and 121 through the security center 133. Gateway router 127 performs an analogous function for computer networks 129 and 131.

Accordingly, exemplary embodiments of system 100 enable the provision of security services to any number of customers through either public or private computer networks. Customers can receive these services with little or no modifications to their existing computer network infrastructure. As mentioned, the security center 133 can be implemented according to the precepts of cloud computing, which is defined by dynamically scalable and often virtualized resources.

Figure 2:
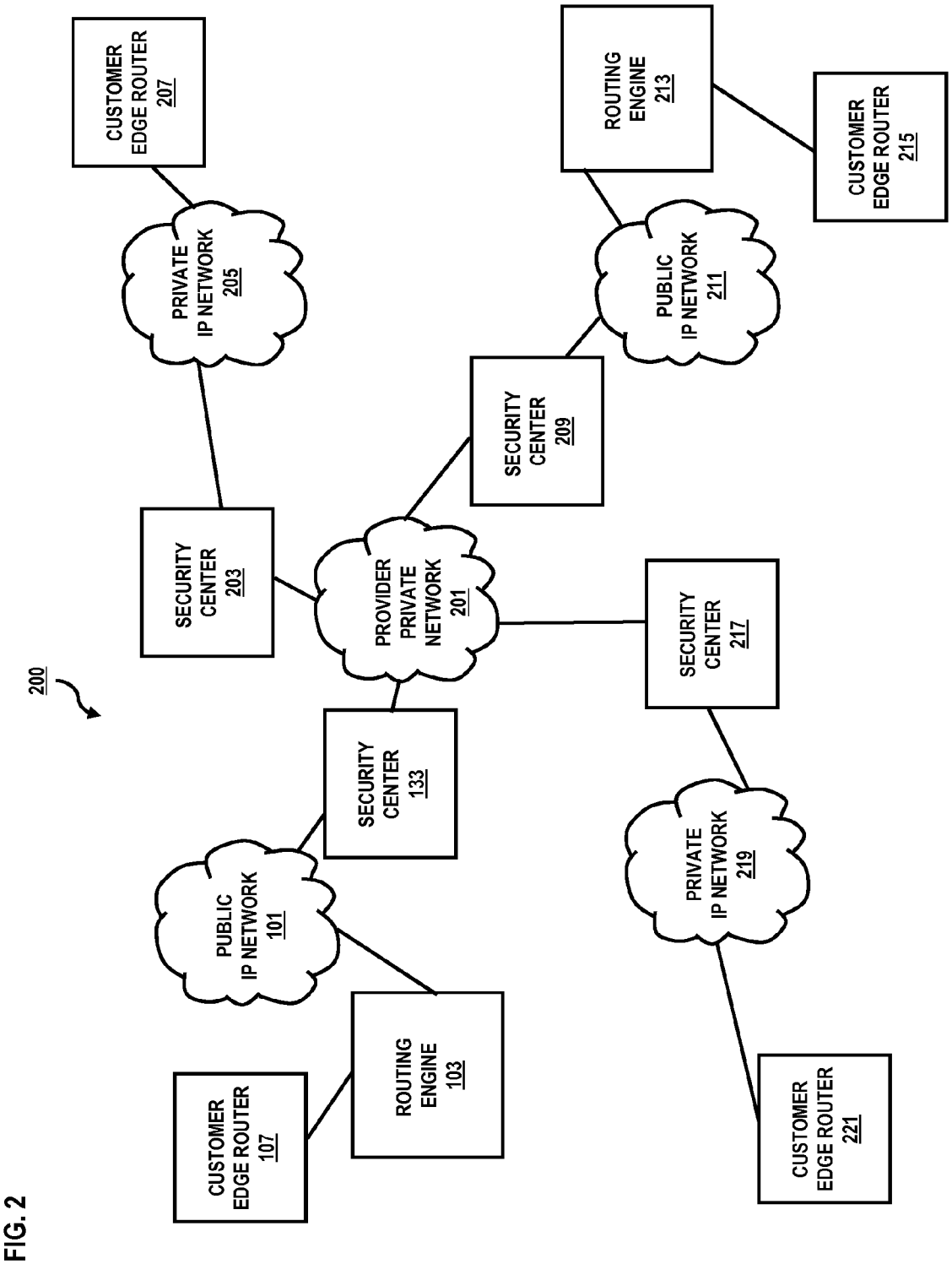
FIG. 2 is a diagram of a system providing geographically distributed security centers, according to various exemplary embodiments.

FIG. 2 is a diagram of a system, comprising a plurality of geographically distributed security centers and computer network infrastructure, configured to provide computer network security services to geographically distributed customers, according to various exemplary embodiments. A geographically distributed system 200 comprises the security center 133 (FIG. 1A) and other security centers 203, 209 and 217 that may all be in different locations across the world. The security centers 133, 203, 209 and 217 are linked through a provider private network 201, and may share security service processing, thereby enabling load balancing across the centers 133, 203, 209 and 217. Each of the security centers 133, 203, 209 and 217 is connected to a corresponding customer edge router 107 (FIG. 1A), 207, 215 and 221. The security centers 133, 203, 209 and 217 interact with the customer edge routers 107, 207, 215 and 221 through a corresponding network. Specifically, as described with reference to FIG. 1A, security centers 133 and 209 are coupled to corresponding customer edge routers 107 and 215 through the routing engines 103 and 213 respectively, and through the public data network 101 and a public data network 211, respectively. For purposes of illustration, the public data networks 101 and 211 are shown as completely separate entities. However, according to exemplary embodiments, the public data networks 101 and 211 may each represent the global Internet.

The security centers 203 and 217 interact with corresponding customer edge routers 207 and 221 through private IP networks 205 and 219, respectively. The customer edge routers 207 and 221 may be in different cities, countries or continents.

Figure 3:
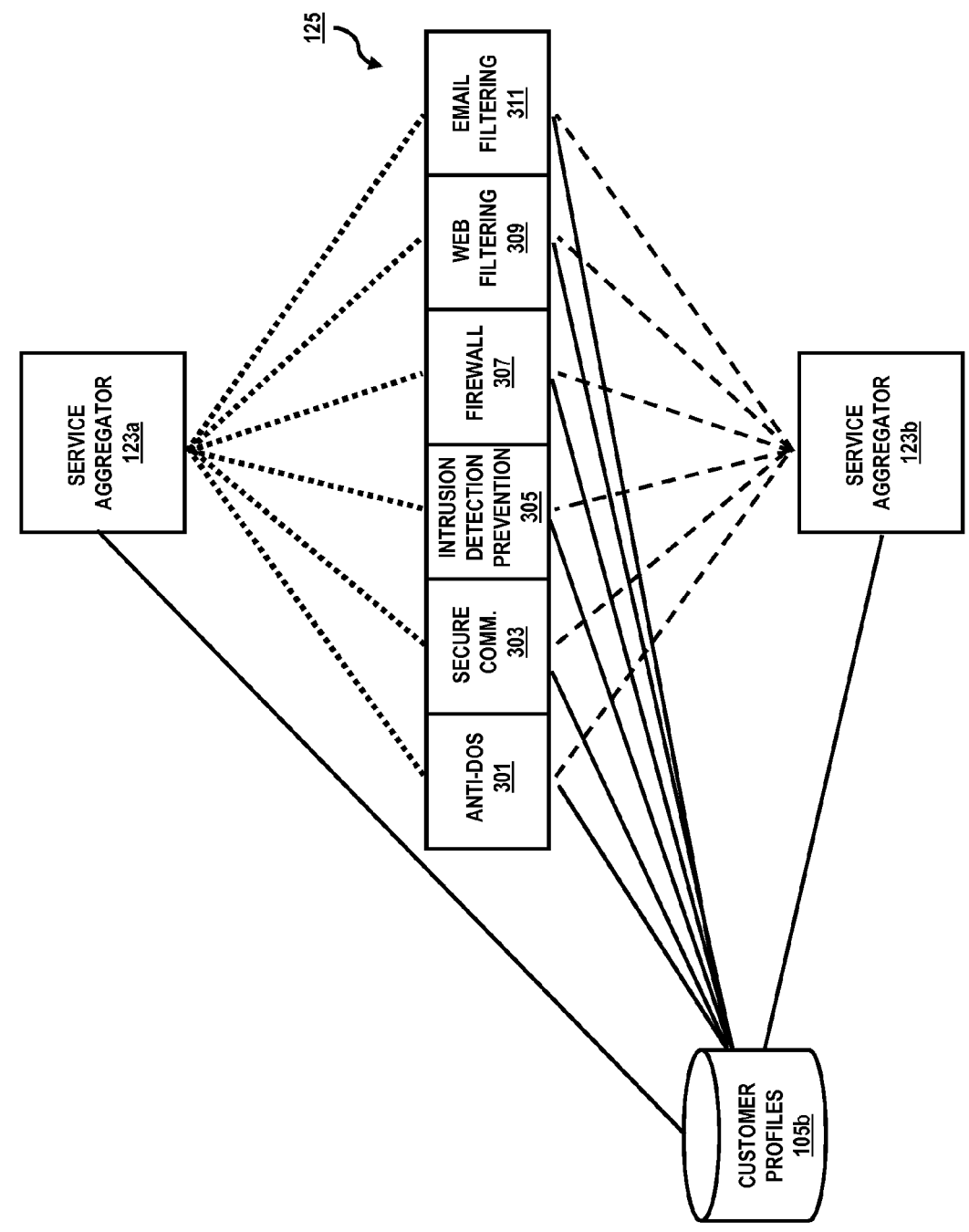
FIG. 3 is a diagram of exemplary security services of the security center of FIG. 1A, according to an exemplary embodiment.

FIG. 3 is a diagram of the security platform 125 (FIG. 1A) that shows various security services provided thereby, and its connection with the service aggregators 123a and 123b, according to an exemplary embodiment. The security platform 125 utilizes multiple security modules, such as, anti-DOS (denial of service) module 301, secure communication services module 303—such as virtual private networks (VPNs) or secure sockets layer (SSL) communications, intrusion detection/prevention module 305, firewall module 307, web filtering module 309, and email filtering module 311. According to an exemplary embodiment, each of the security services may be provided by a dedicated computer (e.g., server). In exemplary embodiments, security services in addition to those mentioned above may be provided.

Each of the service aggregators 123a and 123b separately accesses the service modules 301-311 within the security platform 125. The service aggregators 123a and 123b enforce multi-tenancy rules to keep each customer's data secure and isolated from all of the other customers' data.

In this regard, the service aggregators 123a and 123b can handle customer networks 119, 121, 129 and 131 that implement network address translation (NAT). If the customer edge routers 107 or 113 implement NAT, the internal IP addresses of the networked devices 111a, 111b, 117a and 117 are unavailable outside of the networks 119 and 121, respectively. The customer edge routers 107 and 113 are responsible for ensuring that incoming data is routed to the proper device within the private network. Often, this routing is accomplished by the maintenance of state information, which enables a customer edge router to associate a particular communication stream with a particular device within its private network. Such state information often includes the IP addresses of the source and target networked devices, the port numbers involved in the communication sequence, and information regarding the timing of messages between the communicating devices. In any event, according to NAT, internal IP addresses across private networks may be identical. By maintaining the separation of different customers' data streams, the service aggregators 123a and 123b ensure that any overlapping of private IP address does not cause processing conflicts within the security platform 125.

Each of the service aggregators 123a and 123b accesses the customer profiles database 105b to determine which services are to be performed on a particular customer's data. For any particular communication to or from a customer, only one of the service aggregators 123a or 123b will be responsible for coordinating the security services to be applied to the data stream. The responsible service aggregator 123a or 123b will determine the sequence of security service processing. The responsible service aggregator 123a or 123b will ensure that the sequence is followed by serially sending data to, and receiving processed data from, the service modules 301-311.

Anti-DOS module 301 protects customers against denial of service attacks. Denial of service attacks involve attempts to degrade or disable a particular networked device (e.g. a server) or service. Typically, such attacks are performed by attempting to saturate a server with data, thereby rending the device unable to perform its intended function for legitimate users.

Secure communication services module 303 enables customers to securely communicate over the public data network 101 (FIG. 1A). Secure communication services module 303 supports encryption based protocols, such as VPN and SSL.

Intrusion detection and prevention v 305 detects attempts by outside users ("hackers") to gain unlawful access to resources within the customer networks 119, 121, 129 or 131. Upon detecting such an attempt, the intrusion detection and prevention module 305 will ensure prevent unauthorized access to the customer's system, and may also try to locate the source of the unlawful attempt.

Firewall module 307 performs a variety of services that prevent unauthorized access to customer networks 119, 121, 129 and 131, and that otherwise restrict the types of communications that may occur between these networks and devices outside of these networks.

Web filtering module 309 prevents attempts by users within the customer networks 119, 121, 129 or 131 to access forbidden internet web sites. The access restriction may be context specific, i.e. the restriction may apply selectively to different users, devices or other context parameters (e.g. time of day). The web filtering module 309 determines the applicable rules by accessing the customer profiles database 105b.

Email filtering module 311 applies rules to both incoming and outgoing customer emails. Such filtering may involve the detection and removal of "spam," messages to or from a forbidden email address, messages with suspicious attachments, and/or messages infected with viruses or other malware. Email filtering may also involve the prioritization of emails. The email filtering module 311 accesses the customer profiles database 105b to determine the parameters governing the filtering to be performed.

It is contemplated that additionally or alternatively other security services modules 301-311 can be employed, depending on the requirements of the customer networks. Also, it is contemplated that these modules 301-311 can be implemented using distinct or common software and/or hardware.

Figure 4:
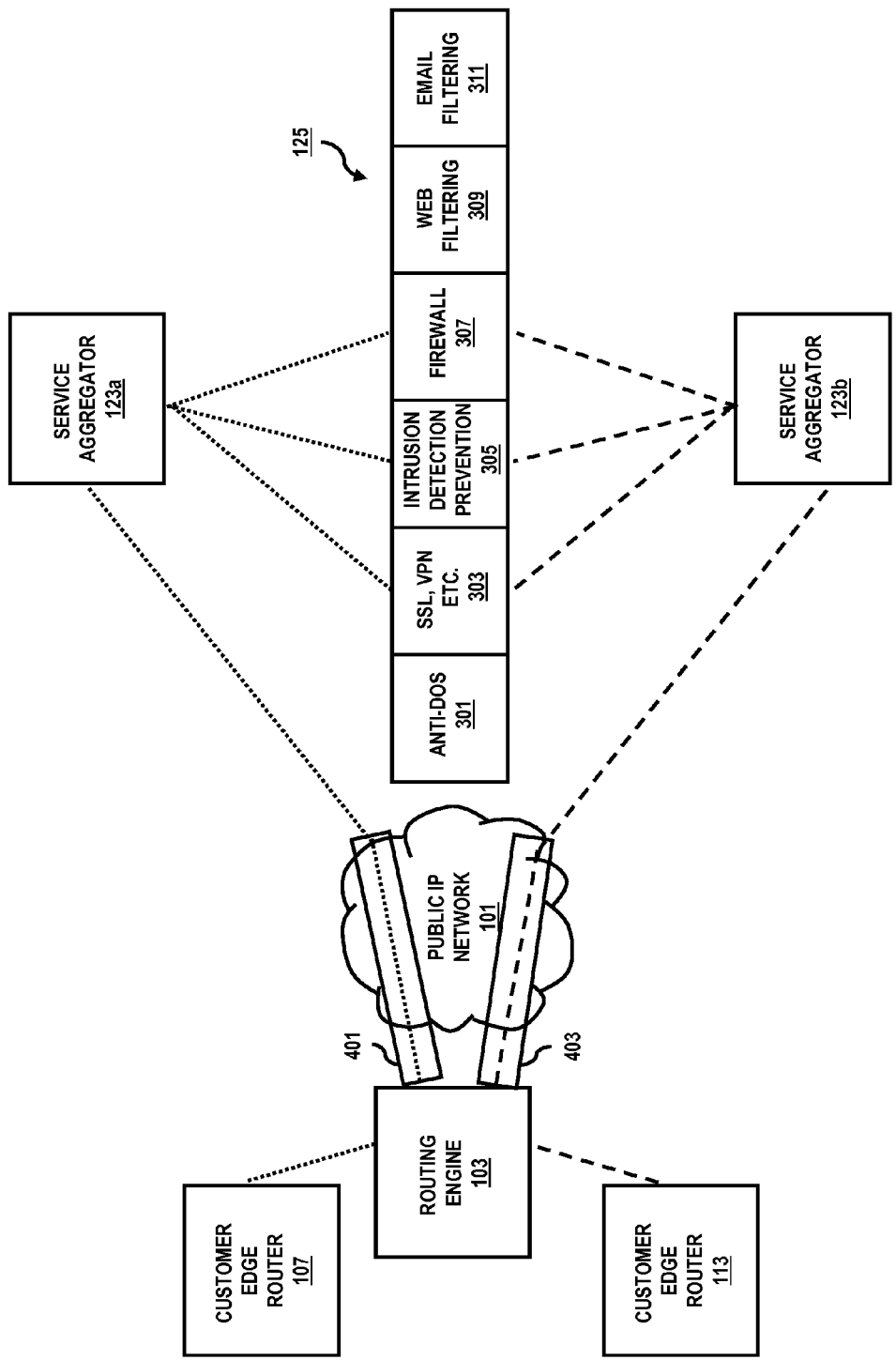
FIG. 4 is a diagram that shows individualized secure communication paths over a public data network for provisioning various security services, according to an exemplary embodiment.

FIG. 4 is a diagram that shows individualized secure communication paths over the public data network 101 for the provision of services provided by the secure communications module 303, the intrusion detection and prevention module 305, and the firewall 307 platform, according to an exemplary embodiment. For purposes of illustration, separate communication paths (tunnels) are shown between service aggregator 123a and customer edge router 107, and between service aggregator 123b and customer edge router 113. In exemplary embodiments, a single service aggregator could securely communicate with a plurality of customer edge routers.

The service aggregators 123a and 123b are linked by Virtual Routing and Forwarding (VRF) communication paths (tunnels) 401 and 403 to the routing engine 103. VRF technology permits use of multiple routing tables within routing engine 103, thereby allowing use of identical or overlapping address spaces without conflict. The VRF communication paths (tunnels) 401 and 403 are virtual private networks implemented with routing and forwarding according to a multi-protocol label switching protocol (MPLS). MPLS enables secure, high speed communication between each of the service aggregators 123a and 123b and the routing engine 103 over the public data network 101. For purposes of illustration, two VRF communication paths 401 and 403 are shown, corresponding to two customer edge routers 107 and 113. In exemplary embodiments, there is a separate VRF communication path for each customer edge router. Establishing separate VRF MPLS communication paths 401 and 403 for corresponding customer edge routers 107 and 113 enables the provision of secure communication services, intrusion detection/prevention services and firewall services over the public data network 101.

Figure 5:
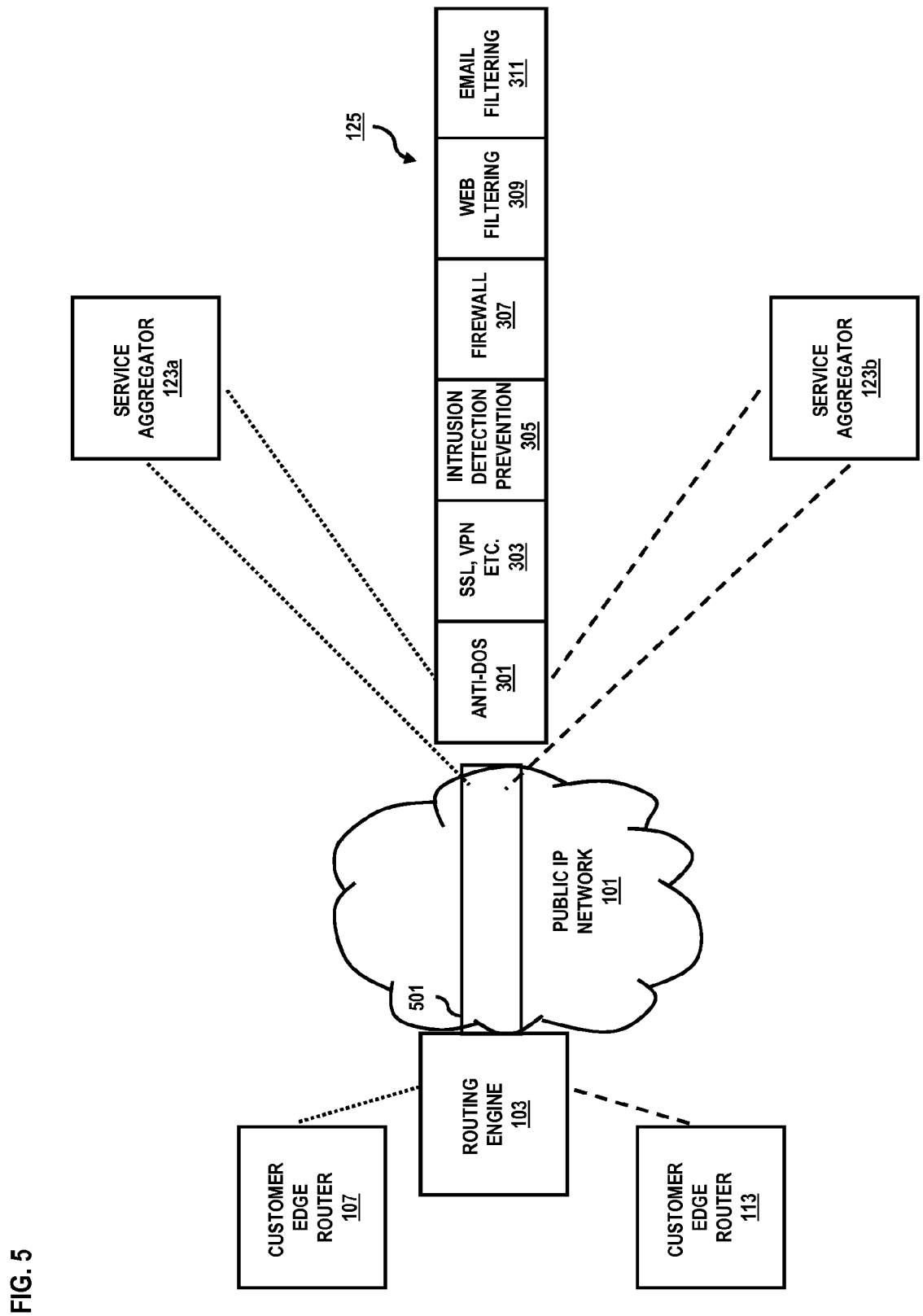
FIG. 5 is a diagram that shows a secure communication path over a public computer network for the provision of a particular security service, according to an exemplary embodiment.

FIG. 5 is a diagram that shows a single secure communication path over the public data network 101 for the provision of services provided by the anti-DOS module 301, according to an exemplary embodiment. For purposes of illustration, separate communication paths are shown between service aggregator 123a and customer edge router 107, and between service aggregator 123b and customer edge router 113. In exemplary embodiments, a single service aggregator could securely communicate with one or more customer edge routers.

Under the scenario of FIG. 5, the service aggregators 123a and 123b are linked by a VPN communication path (tunnel) 501 to the routing engine 103. The VPN communication path 501 is a virtual private network that securely links both of the service aggregators 123a and 123b with the routing engine 103. However, unlike the communication architecture shown in FIG. 4, data associated with multiple customers is carried over the public data network 101 through a single virtual private network, VPN communication path 501, which eliminates the communications overhead associated with establishing separate paths for individual customer edge routers.

Figure 6:
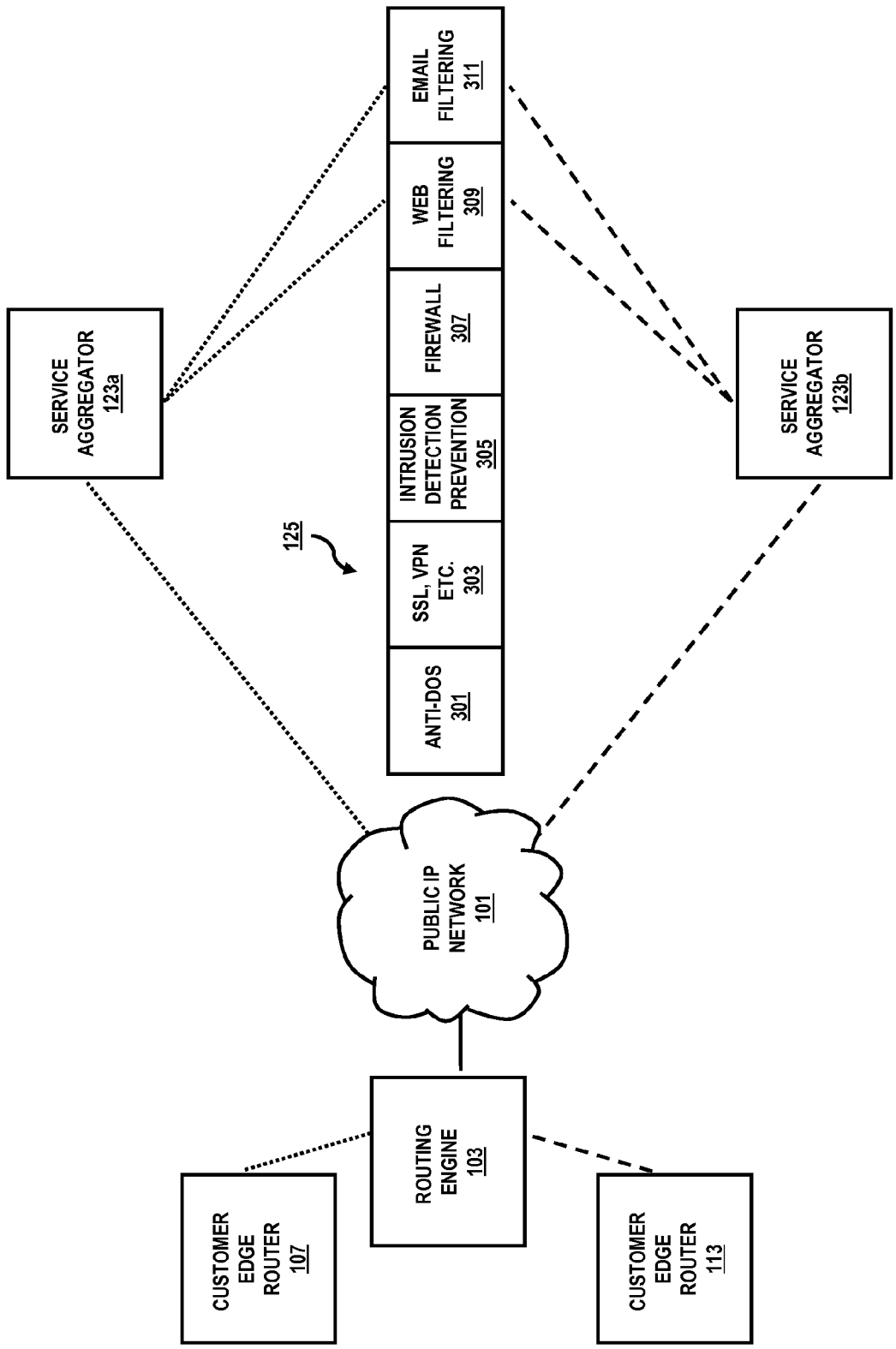
FIG. 6 is a diagram that shows a normal communication path over a public computer network for the provision of various security services, according to an exemplary embodiment.

FIG. 6 is a diagram that shows a normal communication path over the public data network 101 for the provision of services provided by the web filtering module 309 and the email filtering module 311, according to an exemplary embodiment. The service aggregators 123a and 123b communicate with the routing engine 103 over the public data network 101 according to standard (unsecure) internet protocols. Thus, unlike the communication architectures shown in FIGS. 4 and 5, data associated with multiple customers is carried over the public data network 101 without recourse to any type of individualized or secure communication channel, which eliminates the communications overhead associated with establishing separate paths for individual customer edge routers (FIG. 4) or the communications overhead associated with establishing a single virtual private network (FIG. 5).

Figure 7B:
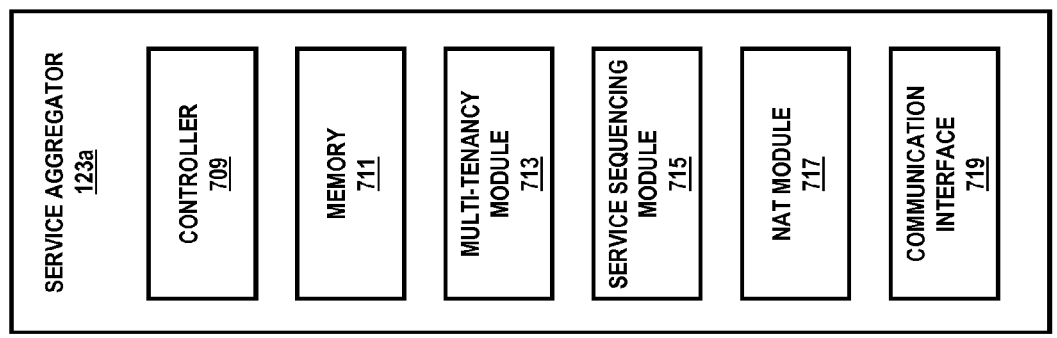
FIGS. 7A and 7B are diagrams of a routing engine and a service aggregator, respectively, utilized in the system of FIG. 1A, according to various embodiments.
Figure 7A:
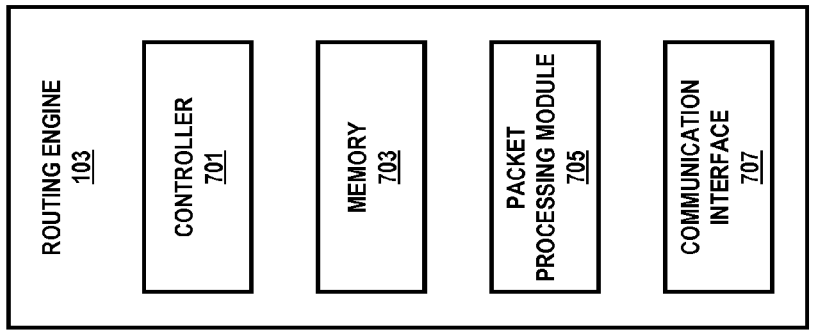

FIGS. 7A and 7B are diagrams of a routing engine and a service aggregator, respectively, utilized in the system of FIG. 1A, according to various embodiments. As seen in FIG. 7a, the routing engine 103 may comprise computing hardware (such as described with respect to FIG. 10), as well as include one or more components configured to execute the processes described herein to facilitate the provision of security services over public and/or private communication networks. In one implementation, routing engine 103 includes controller (or processor) 701, memory 703, packet processing module 705, and communication interface 707. The routing engine 103 may also communicate with one or more account storage facilities or repositories, such as customer profiles database 105a. While specific reference will be made to this particular implementation, it is also contemplated that the routing engine 103 may embody many forms and include multiple and/or alternative components. For example, it is contemplated that the components of the routing engine 103 may be combined, located in separate structures, or separate locations.

The routing engine 103 receives data packets over the communication interface 707 from within the public data network 101 and from customer edge routers 107 and 113 using, for example, standard routing protocols. Routing protocols, such as open-shortest path first (OSPF) and intermediate system to intermediate system (IS-IS), are utilized to determine MPLS traffic flow routes through the network, as well as govern the distribution of routing information between nodes of the network(s). OSPF and IS-IS utilize various attributes characterizing the links, such as bandwidth, to determine, reserve, and validate MPLS traffic flow routes and, thereby, require nodes of the network to report (or announce) these characteristics concerning any directly connected links.

The controller 701 coordinates the storage of the data packets in the memory 703, where they are processed by the packet processing module 705. The packet processing module 705 examines both the source and target IP addresses of a data packet. If a data packet was sent from one of the service aggregators 123a or 123b, then the data packet was already processed by the security center 133 and is therefore sent to the customer indicated by the target IP address.

If a data packet was sent by a customer, which the packet processing module 705 determines by performing a search within the customer profiles database 105*a*, then the packet processing module 705 determines the type of service to be applied to the data. Depending on the service, the controller 701 will route the data to one of the service aggregators 123*a* or 123*b* over a VRF communication path (FIG. 4), over a dedicated VPN (FIG. 5), or through normal, unsecured internet pathways (FIG. 6). In all cases, packets are transmitted by the communication interface 707 under the control of controller 701.

FIG. 7B is a diagram of the service aggregator 123*a*, which is identical to the service aggregator 123*b* in an exemplary embodiment. The service aggregator 123*a* may comprise computing hardware (such as described with respect to FIG. 10), as well as include one or more components configured to execute the processes described herein to facilitate the provision of security services over public and/or private communication networks. In one implementation, service aggregator 123*a* includes controller (or processor) 709, memory 711, multi-tenancy module 713, service sequencing module 715, NAT module 717, and communication interface 719. The service aggregator 123*a* may also communicate with one or more account storage facilities or repositories, such as customer profiles database 105*b*. While specific reference will be made to this particular implementation, it is also contemplated that the service aggregator 123*a* may embody many forms and include multiple and/or alternative components. For example, it is contemplated that the components of the service aggregator 123*a* may be combined, located in separate structures, or separate locations.

The service aggregator 123*a* receives data packets over the communication interface 719 from either the routing engine 103*a* over the public data network 101 or from the gateway router 127. The controller 709 coordinates the storage of the data packets in the memory 711, where they are processed by the multi-tenancy module 713, the service sequencing module 715 and the NAT module 717.

The service sequencing module 715 determines the identity of the customer associated with the data by analyzing the source and target IP addresses or by examining the customer identification information appended to the data by the routing engine 103. If the data corresponds to a communication between customers, then the service sequencing module 715 ensures that two sets of services are separately applied to the data, one set of services for each of the two customers. The service sequencing module 715 determines the services to be performed on the data by searching within the customer profiles database 105*b*. The service sequencing module 715 then coordinates the serial performance of the services, by sending the data to, and receiving processed data from, the pertinent security service platforms within the security platform 125. The data associated these communications is transmitted and received through the communication interface under the control of the controller 709.

Multi-tenancy module 713 ensures the segregation of data associated with different customers. Due to NAT, the internal IP addresses associated with different customers may overlap. The multi-tenancy module 713, operating in conjunction with the NAT module 717, allows security services to be separately applied to data associated with possibly overlapping IP address.

NAT module 717 may perform network address translation on data packets that originate from the customer and/or data packets that are directed to the customer. NAT is a procedure whereby one network address and/or port number is substituted for a different network address and/or port number. When NAT is performed by the NAT module 717 on the source IP address and/or port number of data packets sent by a customer's networked device, such as the computer 111*a* in the customer network 119, the destination networked device will not have access to the internal IP address of the computer 111*a*. Instead, the destination device will respond to the computer 111*a* by sending data to the IP address/port in the customer edge router 107; routing engine 103 or one of the service aggregators 123*a* or 123*b*, which was substituted as the source IP address on the data originating from computer 111*a*. NAT module 717 maintains a state table that enables it to translate the substituted source IP address to the original internal IP address/port of the computer 111*a*.

The NAT module 717 also may process communications initiated by an external network device that are directed to a customer's internal networked device, such as the computer 111*a* in the customer network 119. Such externally initiated communications are possible through either static IP address assignment or static inbound translation, which is commonly known as port forwarding. Static IP address assignment involves the dedication of a single, publicly available IP address to a single internal IP address. Port forwarding involves the dedication of a single combination of a publicly available IP address and port number to a single internal IP address. According to port forwarding, different internal devices may have the same external IP address but different external port numbers.

In any event, because some security services are specific to particular networked devices within a customer's network, the service aggregator 123*a* must have access to these internal IP addresses. The NAT module 717 ensures that these internal addresses are available to the pertinent platforms within the security platform 125.

Figure 8:
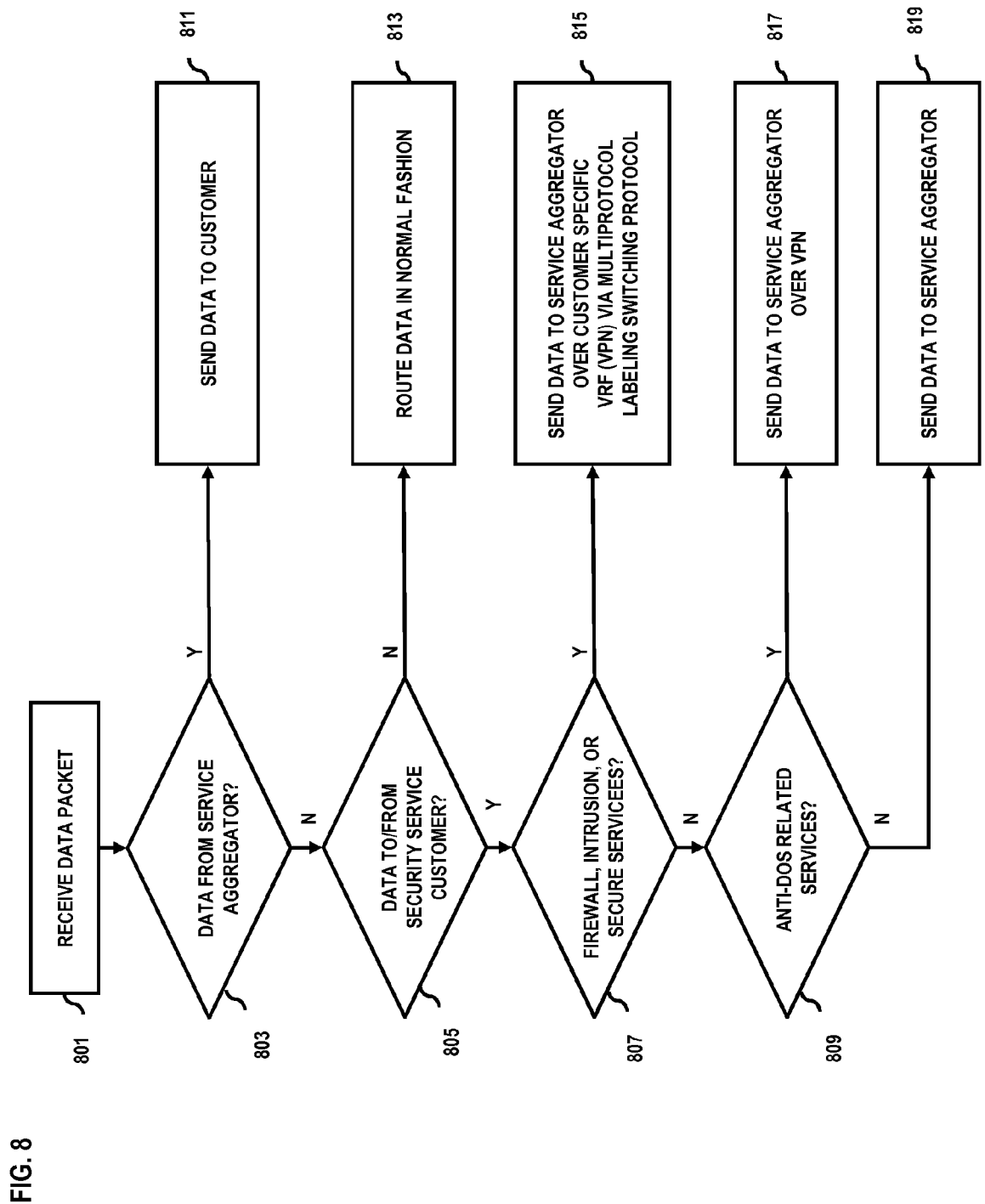
FIG. 8 is a flowchart of a process for routing data directed to or from a customer to a security center, according to an exemplary embodiment.

FIG. 8 is a flowchart of a process implemented by the routing engine 103 for routing data directed to or from a customer to the security center 133, according to an exemplary embodiment. In step 801, the routing engine 103 receives a data packet through the communication interface 707, which is linked to the customer edge routers 107 and 113 and the public data network 101. In step 803, the routing engine 103 determines whether the data was sent from one of the service aggregators 123*a* or 123*b*. If so, the data has already been processed by the security center 133 and is therefore transmitted to the customer in step 811.

Returning to step 803, if the data was not sent by a service aggregator, step 805 is performed. In step 805, the routing engine 103 determines whether the data was either sent from or to a security service customer. If not, the data is routed normally in step 813. Otherwise, step 807 is performed, which determines whether the data is subject to firewall, intrusion or secure communication services (which correspond to the firewall module 307, the intrusion detection/prevention module 305, and the secure communication module 303, respectively). If the data has not previously been processed by one of the service aggregators 123*a* or 123*b*, this determination is made by referring to information in the customer profiles database 105*a*. If the data has previously been processed by one of the service aggregators 123*a* or 123*b*, this determination is made by accessing a security services log associated with the data that is generated by one of the service aggregators 123*a* or 123*b*. If so, step 815 is performed next.

In step 815, the routing engine 103 establishes a VPN session with one of the service aggregators 123*a* or 123*b* via a multiprotocol labeling switching protocol (MPLS). The routing engine 103 maintains a routing table instance for the communication according to VRF. VRF over MPLS enables high speed communication over the public data network 101 through a communication path 401 or 403 (tunnel) that is dedicated to a particular customer.

Returning to step 807, if the data is not subject to firewall, intrusion or secure services, then step 809 determines whether the data is subject to anti-DOS services corresponding to the anti-DOS module 301. If so, the data is sent to one of the service aggregators 123a or 123b over the public data network 101 through the VPN communication path (tunnel) 501 that carries traffic associated with any number of security service customers.

Finally, if the routing engine 103 determines in step 809 that the data is not subject to anti-DOS related services, then in step 819, the data is sent to one of the service aggregators 123a or 123b according to a normal, unsecured internet routing protocol.

The processes described herein for providing cloud based network security services may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 9:
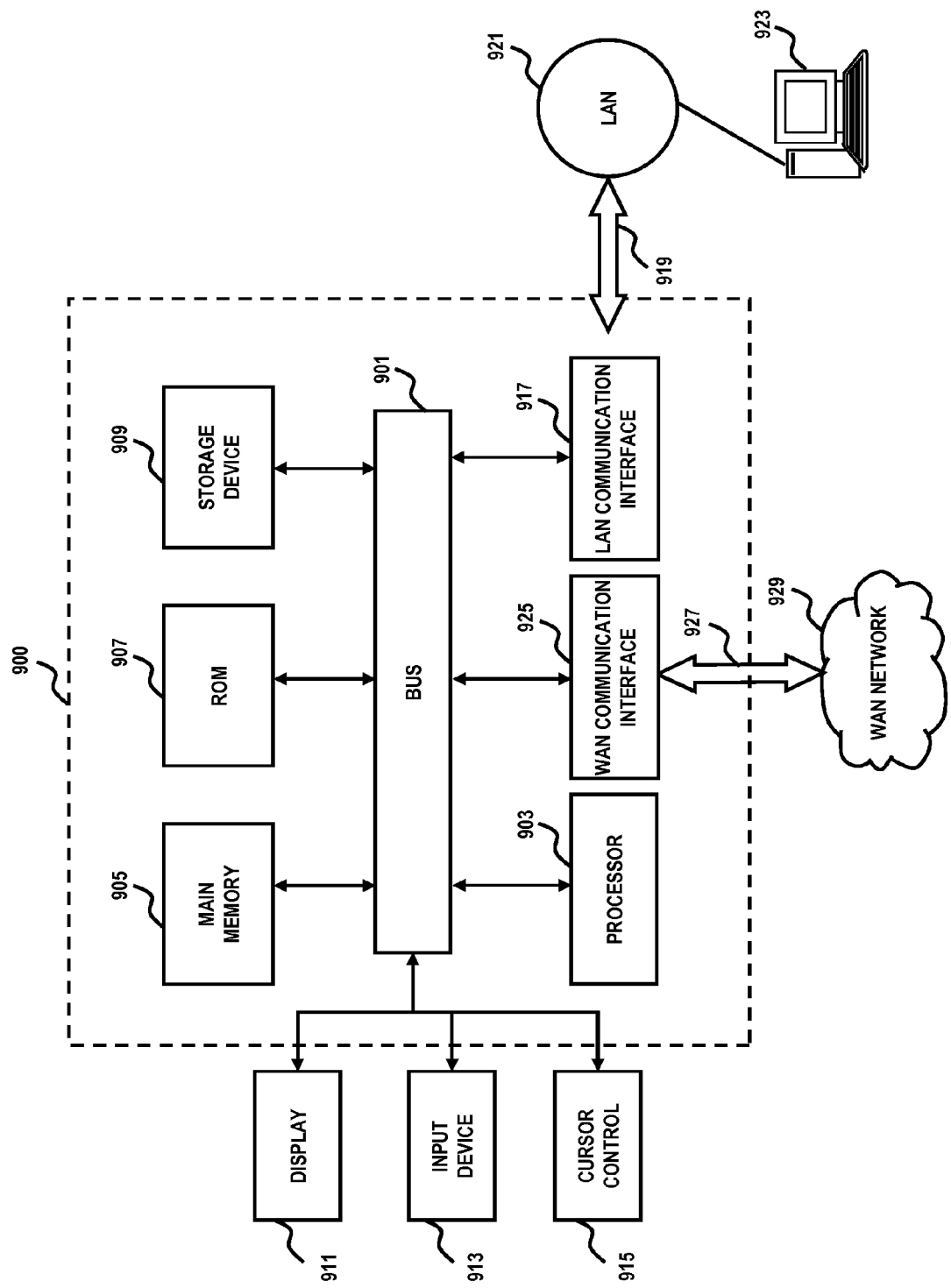
FIG. 9 is a diagram of a computer system that can be used to implement various exemplary embodiments.

FIG. 9 illustrates computing hardware (e.g., computer system) 900 upon which exemplary embodiments can be implemented. The computer system 900 includes a bus 901 or other communication mechanism for communicating information and a processor 903 coupled to the bus 901 for processing information. The computer system 900 also includes main memory 905, such as a random access memory (RAM) or other dynamic storage device, coupled to the bus 901 for storing information and instructions to be executed by the processor 903. Main memory 905 can also be used for storing temporary variables or other intermediate information during execution of instructions by the processor 903. The computer system 900 may further include a read only memory (ROM) 907 or other static storage device coupled to the bus 901 for storing static information and instructions for the processor 903. A storage device 909, such as a magnetic disk or optical disk, is coupled to the bus 901 for persistently storing information and instructions.

The computer system 900 may be coupled via the bus 901 to a display 911, such as a cathode ray tube (CRT), liquid crystal display, active matrix display, or plasma display, for displaying information to a computer user. An input device 913, such as a keyboard including alphanumeric and other keys, is coupled to the bus 901 for communicating information and command selections to the processor 903. Another type of user input device is a cursor control 915, such as a mouse, a trackball, or cursor direction keys, for communicating direction information and command selections to the processor 903 and for controlling cursor movement on the display 911.

According to an exemplary embodiment, the processes described herein are performed by the computer system 900, in response to the processor 903 executing an arrangement of instructions contained in main memory 905. Such instructions can be read into main memory 905 from another computer-readable medium, such as the storage device 909. Execution of the arrangement of instructions contained in main memory 905 causes the processor 903 to perform the process steps described herein. One or more processors in a multi-processing arrangement may also be employed to execute the instructions contained in main memory 905. In alternative embodiments, hard-wired circuitry may be used in place of or in combination with software instructions to implement exemplary embodiments. Thus, exemplary embodiments are not limited to any specific combination of hardware circuitry and software.

The computer system 900 also includes a LAN communication interface 917 coupled to bus 901. The communication interface 917 provides a two-way data communication coupling to a network link 919 connected to a local network 921. For example, the communication interface 917 may be a digital customer line (DSL) card or modem, an integrated services digital network (ISDN) card, a cable modem, a telephone modem, or any other communication interface to provide a data communication connection to a corresponding type of communication line. As another example, communication interface 917 may be a LAN card (e.g. for Ethernet™ or an Asynchronous Transfer Model (ATM) network) to provide a data communication connection to a compatible LAN. Wireless links can also be implemented. In any such implementation, communication interface 917 sends and receives electrical, electromagnetic, or optical signals that carry digital data streams representing various types of information. Further, the communication interface 917 can include peripheral interface devices, such as a Universal Serial Bus (USB) interface, a PCMCIA (Personal Computer Memory Card International Association) interface, etc. Although a single communication interface 917 is depicted in FIG. 9, multiple communication interfaces can also be employed.

The computer system 900 also includes a WAN communication interface 925 coupled to bus 901. The WAN communication interface 917 provide a two-way data communication coupling to a network link 927 connected to a wide area network 929, which may, for example, be the Internet. The WAN communication interface 925 may be a WAN interface card (WIC), or any other communication interface to provide a data communication connection to a corresponding type of communication line. The WAN communication interface 925 may contain an integrated Channel Service Unit/Data Service Unit (CSU/DSU), which connects to a digital circuit such as a T1 or T3 line, represented by the network link 927. In any such implementation, communication interface 927 sends and receives electrical, electromagnetic, or optical signals that carry digital data streams representing various types of information. Although a single communication interface 927 is depicted in FIG. 9, multiple communication interfaces can also be employed.

The network links 919 and 927 typically provide data communication through one or more networks to other data devices. For example, the network link 919 may provide a connection through local network 921 to a host computer 923 or to data equipment operated by a service provider. As an additional example, the network link 927 may provide a connection through WAN network 929 to routers within the WAN. The local network 921 and the WAN network 929 use electrical, electromagnetic, or optical signals to convey information and instructions. The signals through the various networks and the signals on the network links 919 and 925 and through the communication interfaces 917 and 925, which communicate digital data with the computer system 900, are exemplary forms of carrier waves bearing the information and instructions.

The computer system 900 can send messages and receive data, including program code, through the network(s), the network links 919 and 927, and the communication interfaces 917 and 925. In the Internet example, a server (not shown) might transmit requested code belonging to an application program for implementing an exemplary embodiment through the network 929 and the communication interface 925. The processor 903 may execute the transmitted code while being received and/or store the code in the storage device 909, or other non-volatile storage for later execution. In this manner, the computer system 900 may obtain application code in the form of a carrier wave.

The term "computer-readable medium" as used herein refers to any medium that participates in providing instructions to the processor 1003 for execution. Such a medium may take many forms, including but not limited to non-volatile media, volatile media, and transmission media. Non-volatile media include, for example, optical or magnetic disks, such as the storage device 909. Volatile media include dynamic memory, such as main memory 905. Transmission media include coaxial cables, copper wire and fiber optics, including the wires that comprise the bus 901. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the exemplary embodiments may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 10:
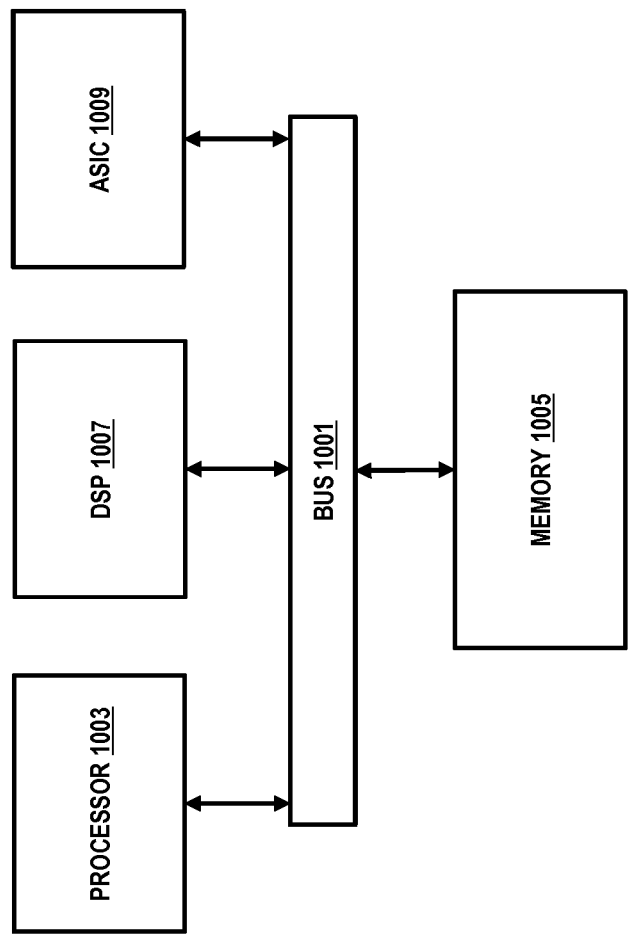
FIG. 10 is a diagram of a chip set that can be used to implement one embodiment.

FIG. 10 illustrates a chip set or chip 1000 upon which an embodiment of the invention may be implemented. Chip set 1000 is programmed to enable computing devices to establish and recognize a relationship group based on physical proximity as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1000 can be implemented in a single chip. It is further contemplated that in certain embodiments the chip set or chip 1000 can be implemented as a single "system on a chip." It is further contemplated that in certain embodiments a separate ASIC would not be used, for example, and that all relevant functions as disclosed herein would be performed by a processor or processors. Chip set or chip 1000, or a portion thereof, constitutes a means for performing one or more steps of enabling computing devices to establish and recognize a relationship group based on physical proximity.

In one embodiment, the chip set or chip 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 1000 includes merely one or more processors and some software and/or firmware supporting and/or relating to and/or for the one or more processors.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to enable computing devices to establish and recognize a relationship group based on physical proximity. The memory 1005 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:
1. A method comprising:
receiving data traffic from a plurality of networks corresponding to a plurality of subscribers;
routing the data traffic over a communication path to one or more service aggregators within a security platform to process the data traffic according to two or more security services performed in sequence by the security platform, wherein the security services are provided as a managed service by a service provider for each of the plurality of subscribers;
receiving the processed data from the one or more service aggregators; and
routing the processed data to the corresponding one of the networks,
wherein the security platform is configured as a network cloud, wherein each of the one or more service aggregators includes a service sequencing module that controls the sequence of the two or more security services that are performed for each of the plurality of subscribers, and wherein, when the data traffic routed to the to the one or more service aggregators within the security platform is sent from a sender that is a subscriber and is destined for a receiver that is another subscriber, two sets of security services are separately applied to the data traffic, one set of security services corresponding to the sender subscriber and one set of security services corresponding to the receiver subscriber.

2. A method according to claim 1, wherein the security platform is configured to determine the one or more security services associated with one of the subscribers, and the data is processed in a predetermined sequence based on the determined security services for the one subscriber.

3. A method according to claim 1, wherein the data traffic is load balanced across a plurality of security platforms including the security platform.

4. A method according to claim 3, wherein the security platforms are arranged to provide redundancy.

5. A method according to claim 1, wherein the security services include firewalling, content filtering, intrusion detection, anti-denial of service, or a combination thereof.

6. A method according to claim 1, wherein the communication path is established according to a multi-tenancy format for the subscribers.

7. An apparatus comprising:
a first interface configured to receive data traffic from a plurality of networks corresponding to a plurality of subscribers;
a routing engine configured to route the data traffic over a communication path to one or more service aggregators within a security platform to process the data traffic according to two or more security services performed in sequence by the security platform, wherein the security services are provided as a managed service by a service provider for each of the plurality of subscribers; and
a second interface configured to receive the processed data from the one or more service aggregators,
wherein the routing engine is further configured to route the processed data to the corresponding one of the networks,
wherein the security platform is configured as a network cloud,
wherein each of the one or more service aggregators includes a service sequencing module that controls the sequence of the two or more security services that are performed for each of the plurality of subscribers, and
wherein, when the data traffic routed to the to the one or more service aggregators within the security platform is sent from a sender that is a subscriber and is destined for a receiver that is another subscriber, two sets of security services are separately applied to the data traffic, one set of security services corresponding to the sender subscriber and one set of security services corresponding to the receiver subscriber.

8. An apparatus according to claim 7, wherein the security platform is configured to determine the one or more security services associated with one of the subscribers, wherein the data is processed in a predetermined sequence based on the determined security services for the one subscriber.

9. An apparatus according to claim 7, wherein the data traffic is load balanced across a plurality of security platforms including the security platform.

10. An apparatus according to claim 9, wherein the security platforms are arranged to provide redundancy.

11. An apparatus according to claim 7, wherein the security services include firewalling, content filtering, intrusion detection, anti-denial of service, or a combination thereof.

12. An apparatus according to claim 7, wherein the communication path is established according to a multi-tenancy format for the subscribers.

13. A system comprising:
a plurality of service aggregators configured to receive data traffic, via a gateway router, from a plurality of networks corresponding to a plurality of subscribers,
wherein the service aggregators are further configured to communicate with a security platform that is configured to process the data traffic according to two or more security services as a managed service for each of the plurality of subscribers, the service aggregators being configured to forward the processed data to the corresponding one of the networks via the gateway router,
wherein the security platform is configured as a network cloud
wherein each of the one or more service aggregators includes a service sequencing module that controls the sequence of the two or more security services that are performed for each of the plurality of subscribers, and
wherein, when the data traffic routed to the to the one or more service aggregators within the security platform is sent from a sender that is a subscriber and is destined for a receiver that is another subscriber, two sets of security services are separately applied to the data traffic, one set of security services corresponding to the sender subscriber and one set of security services corresponding to the receiver subscriber.

14. A system according to claim 13, wherein the security platform is configured to determine the one or more security services associated with one of the subscribers, wherein the data is processed in a predetermined sequence based on the determined security services for the one subscriber.

15. A system according to claim 13, wherein the security services include firewalling, content filtering, intrusion detection, anti-denial of service, or a combination thereof.

* * * * *